US00RE50272E

(19) United States
(12) Reissued Patent
Haba et al.

(10) Patent Number: US RE50,272 E
(45) Date of Reissued Patent: Jan. 14, 2025

(54) REMOTE OPTICAL ENGINE FOR VIRTUAL REALITY OR AUGMENTED REALITY HEADSETS

(71) Applicant: Adeia Semiconductor Technologies LLC, San Jose, CA (US)

(72) Inventors: Belgacem Haba, Saratoga, CA (US); Ilyas Mohammed, Santa Clara, CA (US); Rajesh Katkar, Milpitas, CA (US)

(73) Assignee: Adeia Semiconductor Technologies LLC, San Jose, CA (US)

(21) Appl. No.: 17/383,688

(22) Filed: Jul. 23, 2021

Related U.S. Patent Documents

Reissue of:
(64) Patent No.: 10,802,285
Issued: Oct. 13, 2020
Appl. No.: 16/292,705
Filed: Mar. 5, 2019

U.S. Applications:
(60) Provisional application No. 62/638,519, filed on Mar. 5, 2018.

(51) Int. Cl.
*G02B 27/01* (2006.01)

(52) U.S. Cl.
CPC .. *G02B 27/0172* (2013.01); *G02B 2027/0134* (2013.01); *G02B 2027/015* (2013.01); *G09G 2370/18* (2013.01)

(58) Field of Classification Search
CPC ..... G02B 27/0172; G02B 2027/0134; G02B 2027/015; G02B 2027/0178; G02B 27/4205; G09G 2370/18; G09G 2370/022; G09G 5/006; G06F 3/147
See application file for complete search history.

(56) References Cited

U.S. PATENT DOCUMENTS

| | | | |
|---|---|---|---|
| 3,272,177 | A | 9/1966 | Kelley |
| 4,734,767 | A | 3/1988 | Kaneko et al. |
| 5,021,891 | A | 6/1991 | Lee |
| 5,107,345 | A | 4/1992 | Lee |
| 5,229,864 | A | 7/1993 | Moronaga et al. |
| 5,301,242 | A | 4/1994 | Gonzales et al. |
| 5,452,104 | A | 9/1995 | Lee |
| 5,515,388 | A | 5/1996 | Yagasaki |
| 5,657,085 | A | 8/1997 | Katto |
| 5,748,792 | A | 5/1998 | Wober |
| 5,903,669 | A | 5/1999 | Hirabayashi |
| 5,905,813 | A | 5/1999 | Terane |

(Continued)

*Primary Examiner* — Dennis G Bonshock
(74) *Attorney, Agent, or Firm* — Haley Guiliano LLP

(57) ABSTRACT

A virtual reality/augmented reality (VR/AR) headset system (including the capability for one or both of virtual reality and augmented reality) includes a remote optical engine. The remote disposition of the optical engine removes many or all of the components of the VR/AR headset system that add weight, heat, and other characteristics that can add to user discomfort in using the system from the headset. An electronic image is received and/or generated remotely at the optical engine, and is transmitted optically from the remote location to the headset to be viewed by the user. One or more optical waveguides may be used to transmit the electronic image to one or more passive displays of the headset, from the remote optical engine.

21 Claims, 8 Drawing Sheets

(56) References Cited

U.S. PATENT DOCUMENTS

| | | | | |
|---|---|---|---|---|
| 5,982,434 | A | 11/1999 | Tong et al. | |
| 5,982,441 | A | 11/1999 | Hurd et al. | |
| 5,990,957 | A | 11/1999 | Ryoo | |
| 6,031,937 | A | 2/2000 | Graffagnino | |
| 6,094,631 | A | 7/2000 | Li et al. | |
| 6,111,913 | A | 8/2000 | Murdock et al. | |
| 6,188,799 | B1 | 2/2001 | Tan et al. | |
| 6,240,135 | B1 | 5/2001 | Kim et al. | |
| 6,256,349 | B1 | 7/2001 | Suzuki et al. | |
| 6,272,177 | B1 | 8/2001 | Murakami et al. | |
| 6,480,547 | B1 | 11/2002 | Chen et al. | |
| 6,526,174 | B1 | 2/2003 | Graffagnino | |
| 6,529,634 | B1 | 3/2003 | Thyagarajan et al. | |
| 6,529,638 | B1 | 3/2003 | Westerman | |
| 6,539,060 | B1 | 3/2003 | Lee et al. | |
| 6,560,370 | B2 | 5/2003 | Ribas-Corbera et al. | |
| 6,665,346 | B1 | 12/2003 | Lee et al. | |
| 7,061,404 | B2 | 6/2006 | Irvine et al. | |
| 7,130,310 | B2 | 10/2006 | Itawaki et al. | |
| 7,227,998 | B2 | 6/2007 | Nakayama et al. | |
| 7,331,311 | B2 | 2/2008 | Hurwitz | |
| 7,595,933 | B2 | 9/2009 | Tang | |
| 9,513,480 | B2 | 12/2016 | Saarikko et al. | |
| 9,946,075 | B1 * | 4/2018 | Hu | G02B 27/0172 |
| 10,034,508 | B2 | 7/2018 | Frank et al. | |
| 10,281,976 | B2 | 5/2019 | Nishizawa et al. | |
| 10,473,933 | B2 | 11/2019 | Wall et al. | |
| 10,564,424 | B2 | 2/2020 | Tanaka et al. | |
| 10,802,285 | B2 | 10/2020 | Haba et al. | |
| 10,969,593 | B2 | 4/2021 | Haba et al. | |
| 2002/0044602 | A1 | 4/2002 | Ohki | |
| 2002/0099853 | A1 | 7/2002 | Tsujii et al. | |
| 2003/0044080 | A1 | 3/2003 | Frishman et al. | |
| 2003/0156648 | A1 | 8/2003 | Holcomb et al. | |
| 2003/0202608 | A1 | 10/2003 | MacInnis et al. | |
| 2003/0206664 | A1 | 11/2003 | Gomila et al. | |
| 2003/0235248 | A1 | 12/2003 | Kim et al. | |
| 2003/0235250 | A1 | 12/2003 | Varma et al. | |
| 2004/0096111 | A1 | 5/2004 | Thyagarajan | |
| 2004/0179608 | A1 | 9/2004 | Holliman et al. | |
| 2005/0276505 | A1 | 12/2005 | Raveendran | |
| 2007/0062433 | A1 * | 3/2007 | Hurwitz | A01K 27/006 114/230.2 |
| 2008/0088937 | A1 * | 4/2008 | Tang | G02B 27/0172 359/630 |
| 2015/0235467 | A1 | 8/2015 | Schowengerdt et al. | |
| 2016/0044981 | A1 * | 2/2016 | Frank | A42B 1/22 2/422 |
| 2016/0238786 | A1 * | 8/2016 | Garner | G02B 6/122 |
| 2016/0327789 | A1 | 11/2016 | Klug et al. | |
| 2017/0010662 | A1 * | 1/2017 | Nishizawa | G06F 3/011 |
| 2017/0184852 | A1 * | 6/2017 | Tanaka | G02B 27/0172 |
| 2017/0242249 | A1 * | 8/2017 | Wall | G02B 6/0016 |
| 2018/0045960 | A1 * | 2/2018 | Palacios | G02B 27/017 |
| 2019/0212487 | A1 | 7/2019 | Danziger et al. | |
| 2019/0272802 | A1 | 9/2019 | Haba et al. | |
| 2020/0409157 | A1 | 12/2020 | Haba et al. | |

* cited by examiner

REMOTE OPTICAL ENGINE FOR VIRTUAL REALITY OR AUGMENTED REALITY HEADSETS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM AND CROSS-REFERENCE TO RELATED APPLICATION

This application *is a reissue application of U.S. Pat. No. 10,802,285, which issued based upon U.S. patent application Ser. No. 16/292,705, which* claims the benefit under 35 U.S.C. § 119(e)(1) of U.S. Provisional Application No. 62/638,519, filed Mar. 5, 2018, which [is] *are* hereby incorporated by reference in [its entirety] *their entireties*.

FIELD

The following description relates to optics transmission over a distance. More particularly, the following description relates to augmented reality (AR) and virtual reality (VR) headsets.

BACKGROUND

Augmented reality (AR) and virtual reality (VR) headsets allow an electronically generated image to be formed on a display of the headset and viewed by a user while the user wears the headset. The electronic image can appear to be some distance in front of the user, beyond the headset, and can also appear to be three-dimensional.

This may be achieved by forming a virtual image on multiple focal planes in front of the eye as well as by providing a stereoscopic image to the user (e.g., a different image is presented to each eye of the user). For example, the different images appear to have different focal distances, from the user's point of view. VR headsets show the generated image to the user, often closing off the user's vision of the outside world. AR headsets are mostly transparent and show the electronically generated image while allowing the user to view the outside real world through the headset. In some cases, the generated image may be superimposed on features of the real world within the user's field of vision, for instance.

AR and VR headsets can often be thick and bulky due to the display, optical engines, other optical elements and associated electronics attached to the headset, often at the front and sides of the headset. They can also be heavy, may need a lot of processing power to generate a bright image on the headset, and can be a source of undesirable heat, for the same reasons.

If greater resolution and more processing power is incorporated for advanced AR, a larger display and associated electronics is coupled to the headset, and the situation can become worse, the headset becoming even more uncomfortable to wear for an extended length of time. For instance, higher resolution can be desirable in the case of viewing a computer screen display, or the like, so that the user can view the full extents of the screen at a useful resolution with the headset. However, higher resolution requires greater processing, additional power, larger display devices, complicated optics and electronics, and so forth, which can result in larger, heavier headsets that produce more heat.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

SUMMARY

Figure 1:
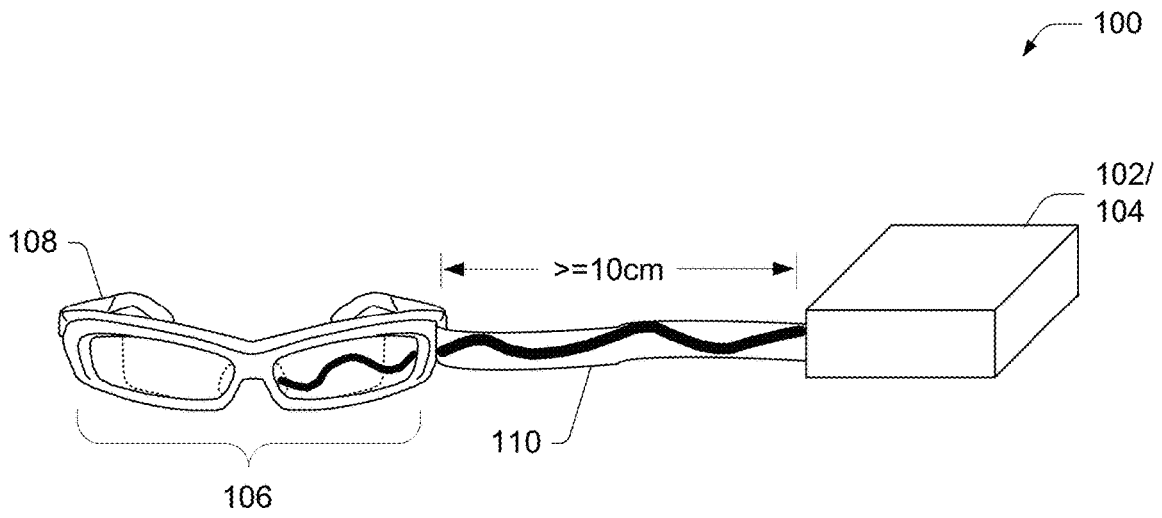
FIG. 1 shows an example VR/AR headset system with remote optical engine, according to an embodiment.

In various implementations, a virtual reality/augmented reality (VR/AR) headset system (including the capability for one or both of virtual reality and augmented reality) is arranged to include a remote optical engine. The remote disposition of the optical engine removes many or all of the components of the VR/AR headset system that add weight, heat, and other characteristics that can add to user discomfort in using the system from the headset. This allows the headset to be lighter and more comfortable for the user to wear, particularly over an extended length of time.

In the implementations, an electronic image is received and/or generated remotely at an optical engine, and is transmitted optically from the remote location to the headset to be viewed by the user. One or more optical waveguides may be used to transmit the image from the optical engine and display placed remotely and projected directly into the waveguide within the headset. In another embodiment, one or more optical waveguides may be used to transmit the electronic image to one or more passive displays of the headset, from the remote optical engine. In another embodiments, an electronic image is generated remotely at an optical engine and is transmitted wirelessly (e.g. Wi-Fi, Bluetooth, ZigBee, Zwave, 3G, 4G, 5G, etc.) from the remote location to the receiver chip in the headset to be viewed by the user via a combination of a light source (e.g., LEDs) and passive displays within the headset.

In the implementations, the system may include a head-mountable frame (such as a glasses frame, headset frame, or the like) configured to be worn by a user to view an electronically generated image. In various examples, the frame has a minimal weight, and may have a minimal frame construction, due to the remote location of the optical engine and processing system. The frame includes a viewing area configured for viewing the electronically generated image.

The system may also include a processing unit disposed remote from the frame, arranged to receive and/or to process an electrical image signal and to generate a processed electrical image signal. Also included is an optical engine disposed remote from the frame and electrically coupled to the processing unit. In the implementations, the optical engine is arranged to receive the processed electrical image signal from the processing unit and to generate an optical image.

In an embodiment, an optical waveguide is coupled at a first end to the frame and coupled at a second end to the optical engine. The optical waveguide can be arranged to deliver the entire optical image from the optical engine to the viewing area of the frame for viewing by the user. In various examples, the optical waveguide is flexible (e.g., flexible optical cable, etc.) or partly flexible (e.g., rigid sections coupled by flexible optical couplers).

In another embodiment, a second optical waveguide is coupled at a first end to the frame and coupled at a second end to the optical engine. In the embodiment, the first optical waveguide is arranged to deliver a first part of a stereoscopic optical image to a first part of the viewing area of the frame and the second optical waveguide is arranged to deliver a second part of the stereoscopic optical image to a second part of the viewing area of the frame. For instance, the first optical waveguide may deliver a "left-eye" image to a left-portion (e.g., a left-side lens) of the frame and the second optical waveguide may deliver a "right-eye" image to a right-portion (e.g., a right-side lens) of the frame for forming a stereoscopic image to the user. In various examples, the second optical waveguide is also flexible or partly flexible. In an embodiment, the one or more flexible optical cables are arranged to simultaneously deliver multiple different optical images superimposed in a field of view of the user. One or more of the multiple different optical images can have different focal distances from a point of view of the user, to form the stereoscopic image.

In an implementation, the frame may include one or more rigid optical waveguides integral to or coupled to the frame. In the implementation, a rigid optical waveguide is coupled to the viewing area at a first end and coupled to the (e.g., flexible or partly flexible) optical waveguide at a second end. In this configuration, the rigid optical waveguide can be arranged to deliver the entire optical image to the viewing area of the frame from the flexible or partly flexible optical wave guide. In various examples, each portion (e.g., left and right portions) of the viewing area includes a rigid optical waveguide configured to deliver an optical image to the respective viewing area portions.

Various implementations and arrangements are discussed with reference to optical, electrical, and electronics components and varied systems. While specific components and systems are mentioned, this is not intended to be limiting, and is for ease of discussion and illustrative convenience. The techniques and devices are applicable to any type or number of optical, electrical, and electronics components, systems, and the like, that may be configured to form a VR/AR headset system with remote image processing and generation, including optical transmission of images from the remote image processing and generation to the viewing apparatus.

Implementations are explained in more detail below using a plurality of examples. Although various implementations and examples are discussed here and below, further implementations and examples may be possible by combining the features and elements of individual implementations and examples.

DETAILED DESCRIPTION

Overview

In various embodiments, components of a virtual reality (VR) or augmented reality (AR) system can include: the frame or headset, which is desirable to keep as small and light as possible; optics of the headset, including glass or plastic lenses, mirrors, waveguides, and the like for directing, focusing, and displaying the image; an optical engine, including a liquid crystal display (LCD), liquid crystal on silicon (LCOS) display, digital light processing (DLP) display, microLED display, or the like, for converting an electrical signal to an optical signal and delivering the image to the optics; a processing unit (CPU and/or GPU) including electronics for receiving and processing an electrical image signal (the processing electronics portion usually includes one or more signal inputs), and delivering the electrical signal to the optical engine; a power source such as a battery; and one or more sensors, which can include a camera, accelerometer, gyroscope, GPS, compass, eye tracking sensors, and so forth, which may interface with the processing unit. Additionally, AR and VR headsets may also include audio processing electronics, audio transducers or speakers, or the like, tactile feedback components, Wi-Fi or other wireless connectivity components, and so forth.

Including many or all of the above components in the AR and VR headset (the "headset") can cause the headset to be thick, bulky, heavy, and hot. For instance, including the optical engine in the headset results in a larger headset or forces the display (LCOS, for example) to be smaller and have a lower resolution.

Example Embodiments

Figure 2:
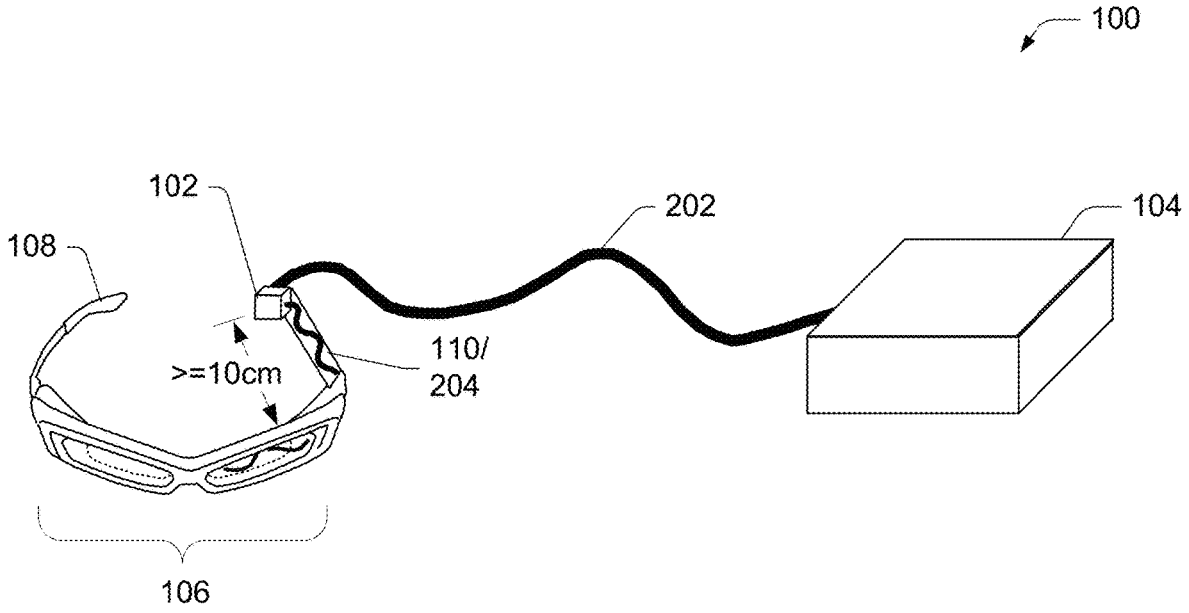
FIG. 2 shows an example VR/AR headset system with remote optical engine, according to another embodiment.

Referring to FIGS. 1 and 2, examples of a virtual reality/augmented reality (VR/AR) headset system 100 (including the capability for virtual reality and/or augmented reality) are shown, according to various implementations. In the implementations, the VR/AR system 100 is configured to include an optical engine 102 and/or a processing unit 104 remote from the viewing area 106 of the headset 108, or remote from the headset 108. The remote disposition of the optical engine 102 and/or the processing unit 104 removes many or all of the components of the VR/AR system 100 that add weight, heat, and other characteristics that can add to user discomfort in using the system from the viewing area 106 or from the headset 108.

In various embodiments, the VR/AR system 100 includes a thin and light headset 108 (or head-mountable frame) to support the viewing area 106. For example, the user can wear the headset 108 on the user's head, with the viewing area 106 positioned in front of the user's eyes. The viewing area 106 may comprise two individual portions or components (such as right and left portions) separate from each other, with each portion positioned over an eye of the user. Alternately, the viewing area 106 may be a single area or component that is divided virtually into at least two portions (such as right and left portions). The viewing area 106 provides a space to view an electronically generated image at the viewing area 106 of the frame 108.

In an embodiment, the VR/AR system 100 includes an optical engine 102 and the processing unit 104. In some examples, the optical engine 102 and the processing unit 104 are integrated into a shared component or system. In other examples, the optical engine 102 and the processing unit 104 are discrete components or systems, or are packaged separately. In either case, the optical engine 102 (including the display) and/or the processing unit 104 (including CPU and GPU) are decoupled from the frame 108 and/or the viewing area 106.

In one implementation, as shown in FIG. 1, the optical engine 102 and the processing unit 104 (and its power source) are not mounted to the body of the headset 108. In various examples, the optical engine 102 and the processing unit 104 may be worn on another part of the user, remote from the user's head, such as on a belt at the user's waist, or the like, while the headset 108 is worn on the user's head.

In another implementation, as shown in FIG. 2, the processing unit 104 (and its power supply) may be worn on the user at a location remote from the frame 108 (such as on a belt) and the optical engine 102 may be located closer to the frame 108 to minimize the length of the flexible waveguide cable and/or rigid waveguide 110. In the implementation, the processing unit 104 may be electrically coupled to the optical engine 102 (via electrical cable 202, e.g., HDMI, DVI, etc. or wireless connectivity).

In various embodiments, the optical engine 102 may be mounted to a hat or other headgear, on a neck strap, or the like, toward the back of the user's head or neck, or generally nearby the frame 108. If the optical engine 102 is near enough, it may be coupled to the frame 108 via a rigid waveguide 204. Otherwise, the optical engine 102 may be coupled to the frame 108 with a short flexible optical cable 110, which may be coupled to a rigid waveguide 204 as described below.

In the implementations, the processing unit 104 includes electronics for receiving and processing an electrical image signal, and for delivering the processed electrical signal to the optical engine. In an example, the processing unit 104 includes one or more wired and/or wireless signal inputs, to receive the image signal from the image source (which may be local or remote to the VR/AR system 100). For instance, the image signal (such as a video stream, a computer display output, etc.) may be received at the processing unit 104 (via a receiver and input/output controller, for example) from a mobile computing device, or the like.

A central processing unit (CPU) and/or a graphics processing unit (GPU) at the processing unit 104 may process the image signal for use with the VR/AR system 100. This may include rendering processing, resolution adaptation, stereoscopic processing, or other image processing as desired. In the implementation, the processing unit 104 is electrically coupled to the optical engine 102. Accordingly, the processed image signal is received at the optical engine 102 from the processing unit 104.

In various embodiments, the optical engine 102 is optically coupled to the frame 108 and associated optics via an optical waveguide 110 or light pipe. In the embodiments, neither the optical engine 102 nor the processing unit 104 are electrically or physically coupled to the frame 108. In an alternate embodiment (as shown in FIG. 2), at least a portion of the optical engine 102 may be physically coupled to a portion of the frame 108, yet remain remote (at least 10 cm) from the viewing area 106. In any case, the optical engine 102 forms an optical image signal and transmits the optical image signal to the viewing area 106 by optical components (e.g., optical waveguide 110, or other optical conductor).

In an implementation, the waveguide 110 is made from an optically transparent (or semi-transparent) material, e.g. glass, polymer, etc., or a combination of one or more such materials. The cross section of the waveguide 110 may have any shape; e.g., circular, rectangular, square, hexagonal, or any other shape.

In an embodiment, the waveguide 110 may transfer light (or an image) using total internal reflection (TIR). In the embodiment, the image is reflected off the interior surfaces of the waveguide 110 as the image travels from one end of the waveguide 110 to the other (e.g., from the optical engine 102 to the viewing area 106). In another embodiment, the waveguide 110 may have a separate reflective coating on the outside surface. The reflective coating is operative to enhance the reflectivity of the inside surface of the waveguide 110, improving the transmission of the image through the waveguide 110. In another embodiment, the waveguide 110 may consist of a graded refractive index material, in which a refractive index of the waveguide 110 progressively reduces from the inner core to the outer surface of the waveguide 110.

In an embodiment, the waveguide 110 comprises a planar waveguide arranged to transfer the optical image from the second end (i.e., the optical engine 102 end of the waveguide 110) of the optical waveguide 110 to the first end of the optical waveguide 110 (i.e., the viewing area 106 end of the waveguide 110). In various implementations, the waveguide 110 comprises a flexible waveguide 110. For instance, the waveguide 110 flexes or bends, with a minimum bend radius of >2.5 times the thickness of the waveguide 110 or the light pipe.

Figure 3:
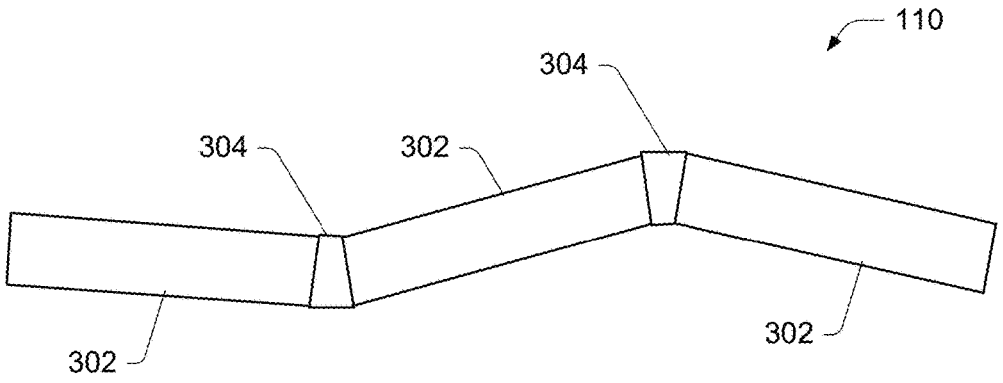
FIG. 3 shows an example flexible waveguide, according to an embodiment.

Referring to FIG. 3, in another implementation, the flexible waveguide 110 may consist of two or more rigid waveguides 302 (e.g., injection molded plastic, glass, etc.) connected together by one or more joining pieces 304 of compliant (flexible) index matching material (e.g. Silicone, or the like). The quantity of flexible pieces 304 will allow for the desired bend in the waveguide 110. In an embodiment, the length of the rigid waveguides 302 are much longer compared to the length of the flexible pieces 304 in order to maintain a desired integrity of the image being transferred. For example, in an embodiment, the ratio of the length of the rigid waveguide 302 to the length of the joining pieces 304 is approximately 10:1. In other embodiments, the ratio may be greater or lesser.

In another implementation, the pieces 304 joining the rigid waveguides 302 may include one or more optical elements (not shown), e.g., one or more lenses (telescopic lenses, relay lenses, etc.), mirrors, polarizers, beam benders, or the like. In various embodiments, the joining pieces 304 may be flexible, or the joining pieces may be inflexible, but include a joint capable of adjusting the angle between the rigid waveguides 302 as desired.

In various embodiments, all signal processing and some or all image processing is done off of the frame 108 at remote components (e.g., a remote optical engine 102 and a remote processing unit 104). In the embodiments, an optical signal is sent to the frame 108, making the frame 108 purely passive. In other words, instead of forming the image at the frame 108 (on a display device attached to the frame 108), the image is formed remotely and delivered to the frame 108 optically. For the purposes of this disclosure, "remote" can be defined as approximately 10 cm or greater distance.

Figure 4:
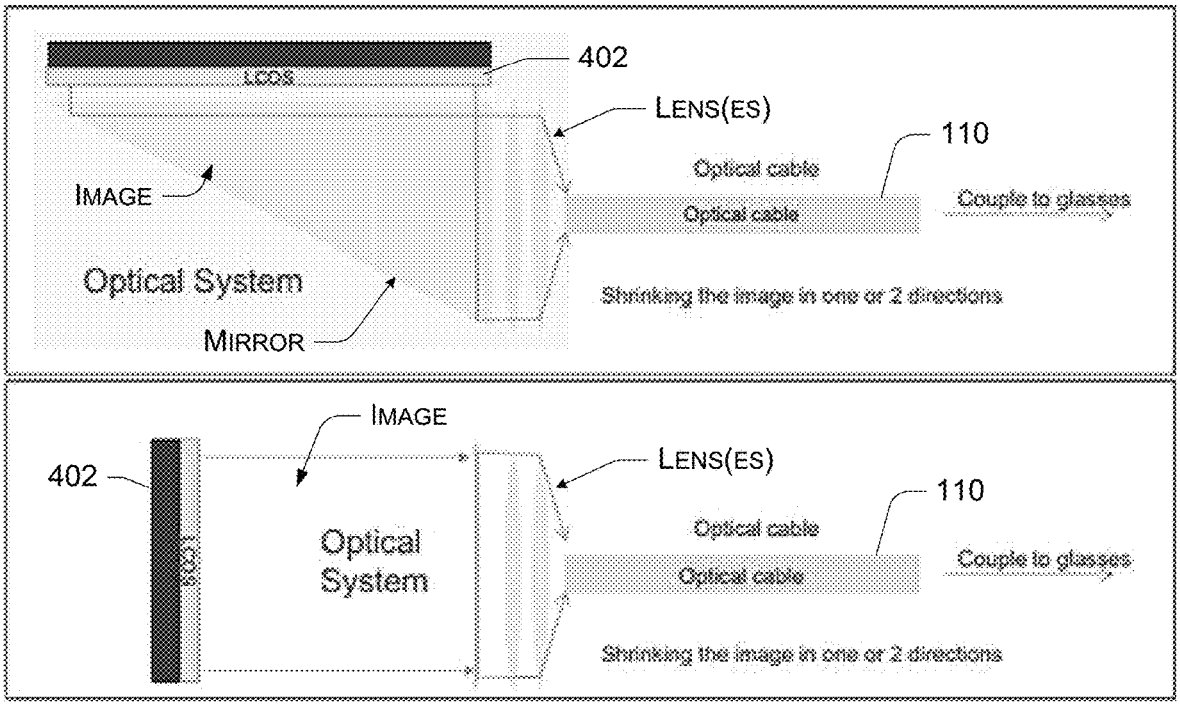
FIG. 4 shows a comparison of display orientations, according to an embodiment.
Figure 5:
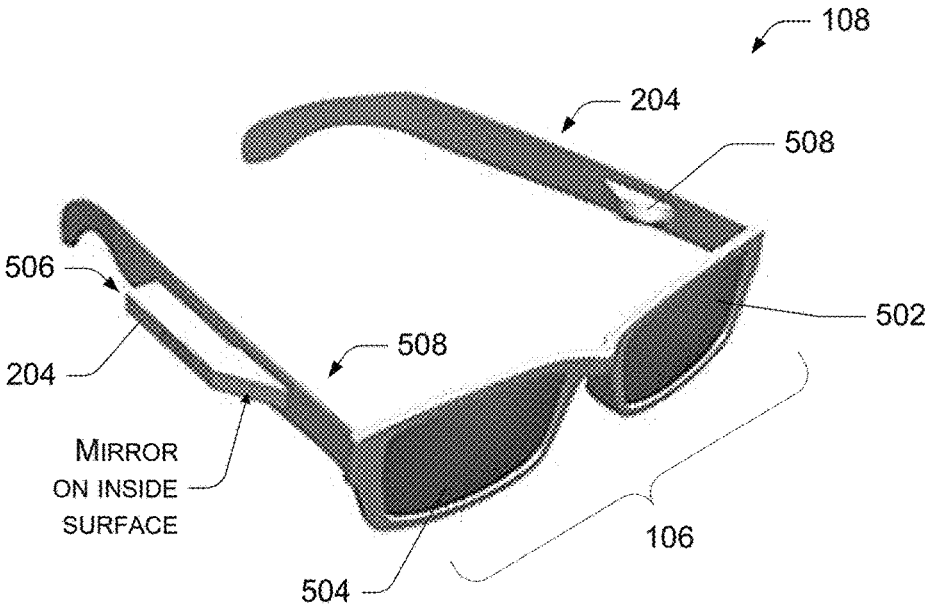
FIG. 5 shows an example VR/AR headset, according to an embodiment.
Figure 6:
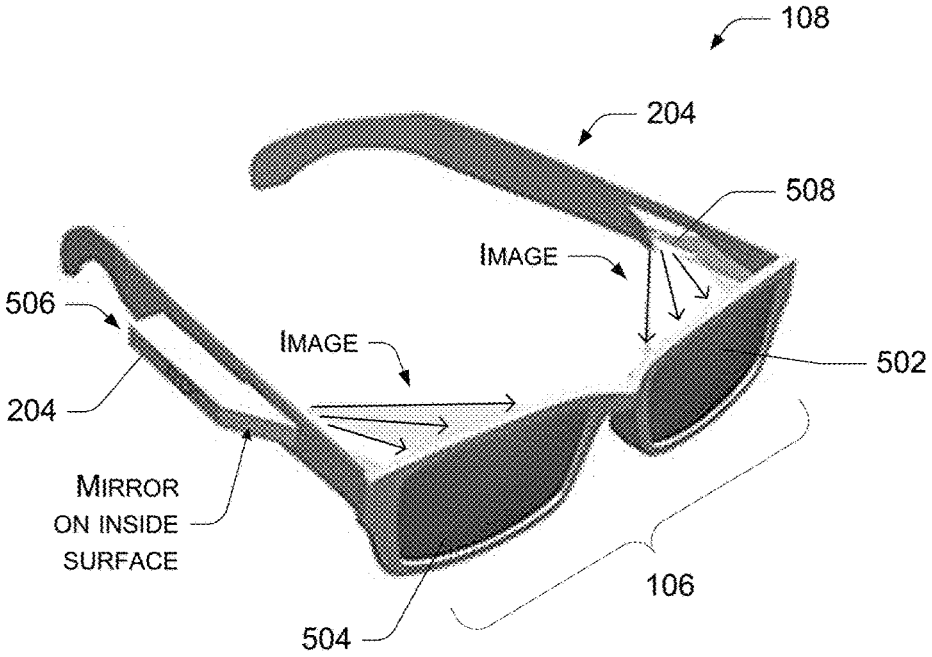
FIG. 6 shows an example of optical image transmission on a VR/AR headset, according to an embodiment.

Referring to FIG. 4, an image may be formed at a display device 402 (liquid crystal on silicon (LCOS) device, for example) at the optical engine 102, where an electrical signal (based on input received at the processing unit 104, processed, and delivered to the optical engine 102) is converted to the image. In embodiments where the optical engine 102 is not located on the frame 108, the display device 402 may have a larger size to accommodate a greater resolution, for example, without impacting the size of the frame 108.

As shown in FIG. 4, the image formed at the display device 402 is a light signal, and may be transferred (using an optional light source and various lenses, mirrors, and the like) to one or more optical cables, including the waveguide 110. In this form, the image travels to the headset 108 and/or the viewing area 106 over the waveguide 110. In some examples, the image may be reduced in one or more dimensions for travel to the headset 108 and/or viewing area 106, while preserving an image front of the optical image displayed at the viewing area 106.

Referring to FIGS. 5-8, an example VR/AR headset frame 108 is shown, according to various embodiments. In the embodiments, the headset frame 108 includes a viewing area 106, which may be physically or virtually separated into a first portion 502 and a second portion 504. Each of the portions 502 and 504 may be fed a separate image signal (light), for stereoscopic viewing. The flexible or partly flexible waveguide 110 is not shown for clarity, but is intended to be coupled to the frame 108.

As discussed above, the image is formed remotely on a display 402 and transported via a light source through a flexible or partly flexible waveguide 110, which extends from the remote optical engine 102 to the frame of the 108. The waveguide 110 or optical cable may comprise an optically transparent cable (such as a fiber optic or glass cable, for instance) with a reflecting surface surrounding the cable, as discussed above. The image is reflected within the waveguide 110 or optical cable over a distance to the frame 108.

In an embodiment, a portion of the frame 108 comprises a rigid waveguide 204. Alternately, the rigid waveguide 204 may be coupled to the frame 108. An optical connector 506 may be used to couple the flexible waveguide 110 to the rigid waveguide 204 of the frame 108. In some embodiments, the frame 108 may include two rigid waveguides 204 (one for each portion 502, 504 of the viewing area 106) which may each have an optical connector 506. In an implementation, a pair of flexible waveguides 110 are coupled to the frame 108 at the rigid waveguides 204 via the optical connectors 506. Alternately, the flexible or partly flexible waveguide 110 extends into the frame 108 (for instance, into the rigid waveguide 204, or the like), eliminating the optical connector 506.

In an alternate embodiment, fiber optics may be disposed within or coupled to the frame 108. The optical fiber(s) may perform the same functions as the rigid waveguide 204, and may be a direct alternative to the rigid waveguide 204 throughout the disclosure. Optical fibers may be sized to have a cross-section to conform with the image transport specifications. In another embodiment, a combination of the waveguide 204 and fiber optics may be used.

In an embodiment, one or more precisely placed mirrors reflect the image from the flexible waveguide 110 to the rigid waveguide 204, within the rigid waveguide 204, and/or from the rigid waveguide 204 to the optics and to the viewing area 106 of the frame 108. The one or more mirrors allow the light carrying the image to "turn corners" as it moves through the waveguides 110, 204 to the viewing area 106. One or more mirrors may have flat surfaces or curved surfaces, or a combination of both.

Figure 7:
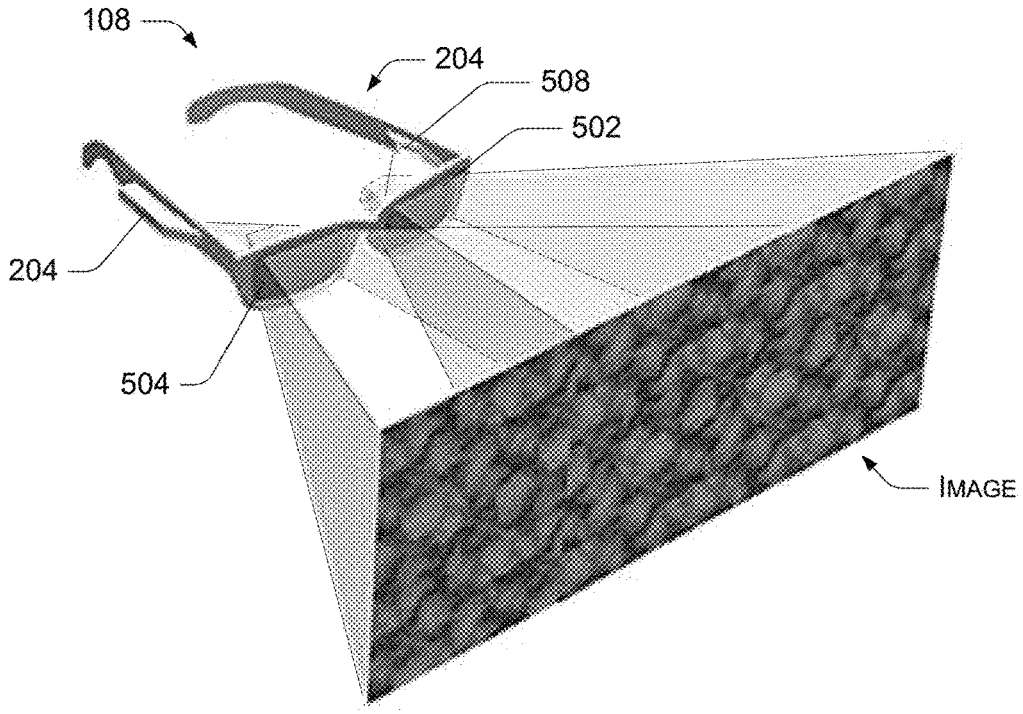
FIGS. 7 and 8 show an example of virtual image generation on a VR/AR headset, according to an embodiment.
Figure 8:
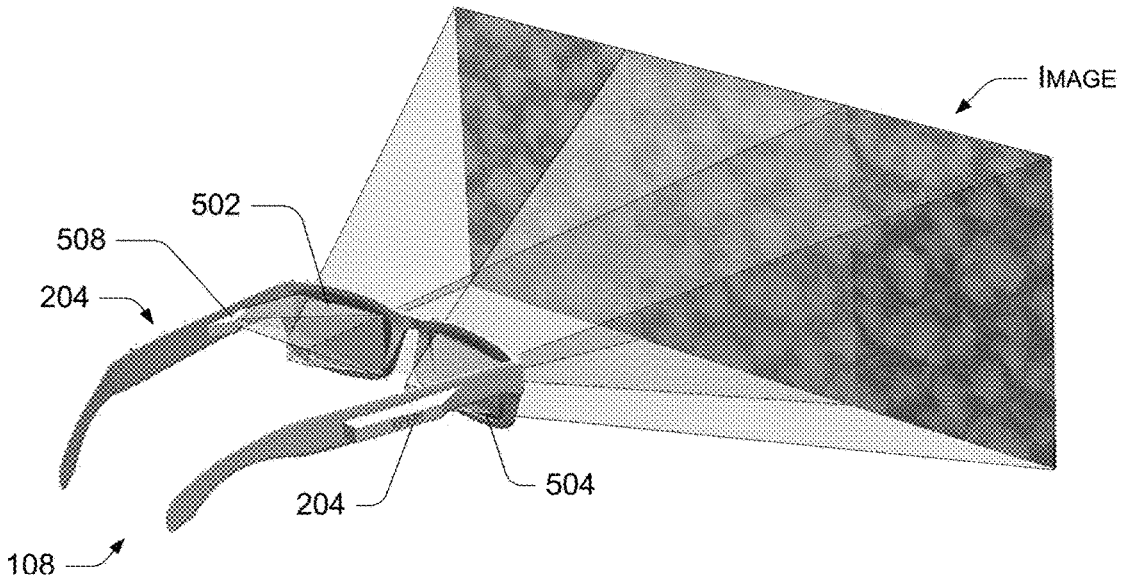
Figure 9:
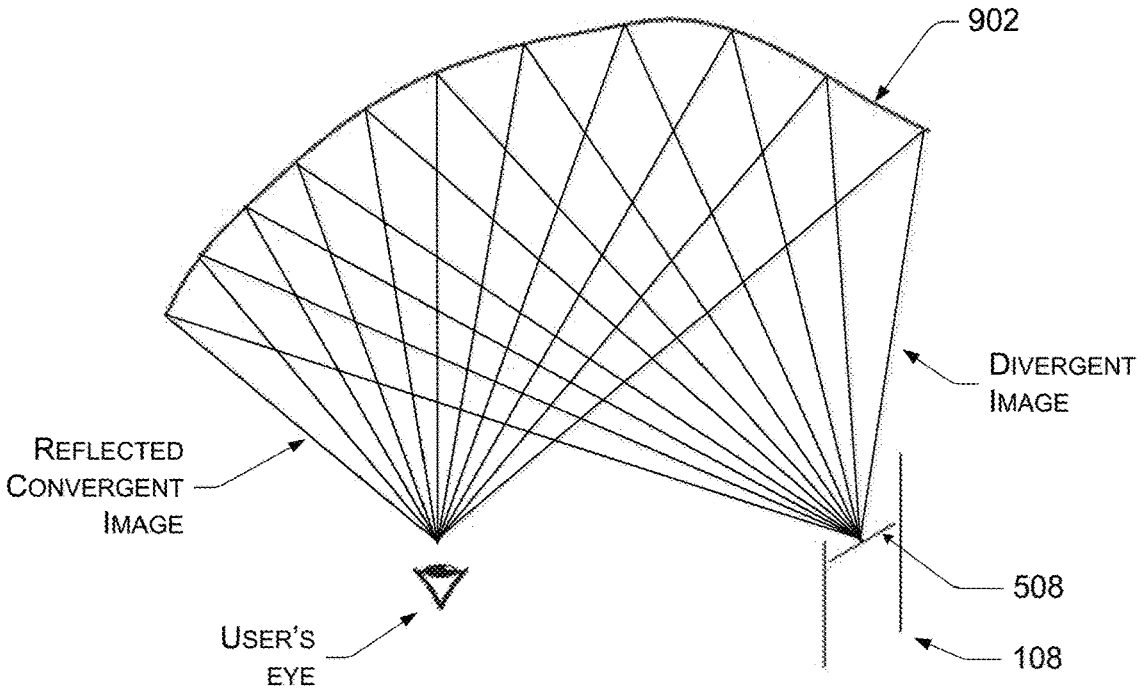
FIGS. 9 and 10 show a lens arrangement for virtual image generation on a VR/AR headset, according to an embodiment.
Figure 11:
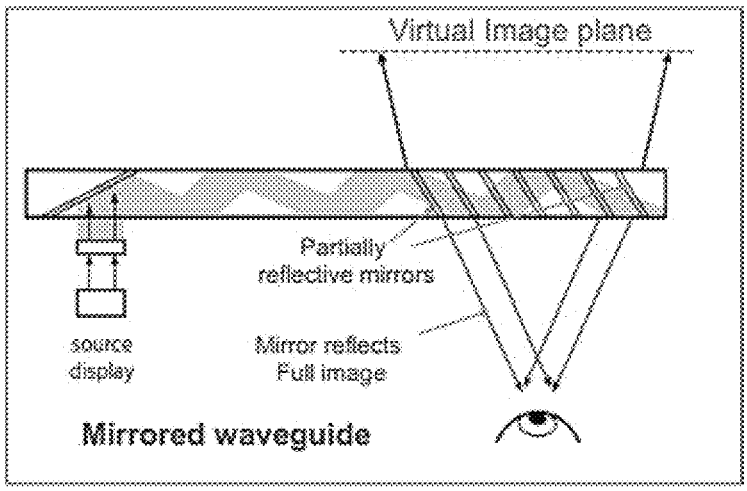
FIG. 11 shows an example of virtual image generation using partially reflective mirrors.
Figure 12:
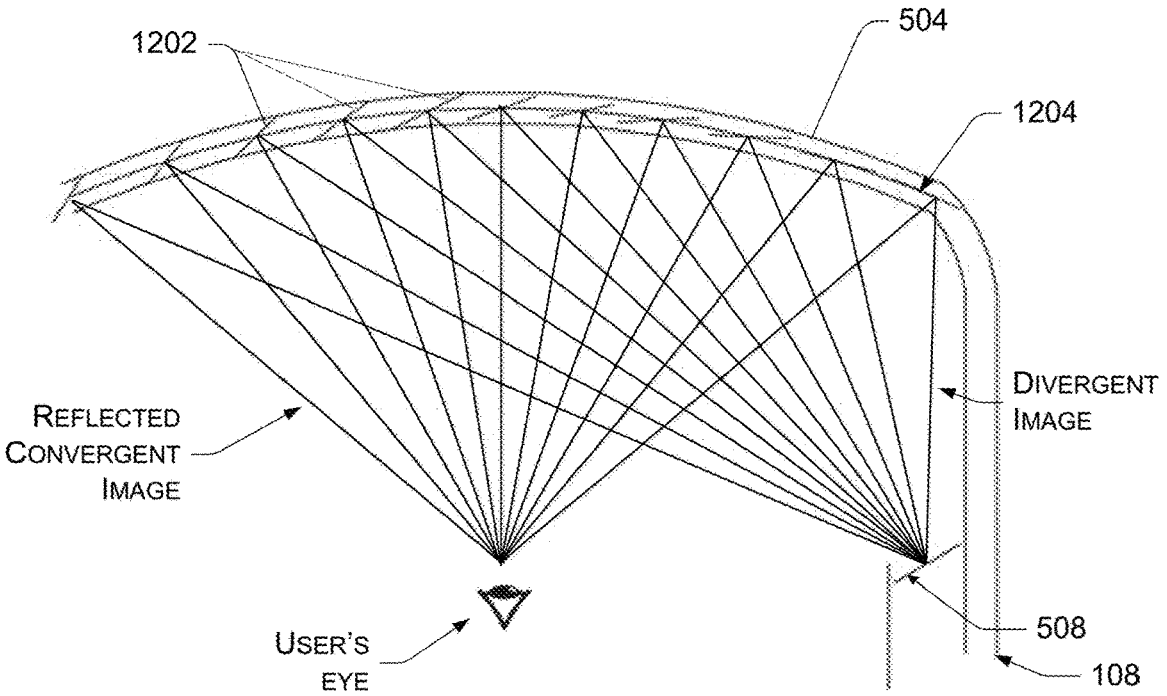
FIGS. 12 and 13 show a lens arrangement for virtual image generation on a VR/AR headset, according to another embodiment.

Referring to FIGS. 5-8, in an implementation, one or more lenses 508 (including a divergent lens) and mirrors (with flat or curved surfaces) of the frame 108 optics direct the image to one or more mirrored surfaces 502, 504 at the viewing area 106 on the inside of the frame 108, which reflect the light carrying the image to the user's eye (see FIGS. 9, 11, and 12, for example). The viewing area 106 may be comprised of a single partially transparent mirror per eye, a set of precisely angled partially transparent mirrors per eye, diffractive optics positioned in front of each eye, or the combination of the mirrors and the diffractive optics, or the like.

In an example, as shown in FIGS. 7 and 8, the image viewed by the user appears to be large and at a distance, based on a virtual "inverted cone" or "inverted pyramid" shape to the reflected light entering the user's eye. In the case of an AR headset frame 108, the semi-transparent mirrors of the viewing area 106 allow the user to be able to see through the 108 to the outside world as well as simultaneously view the electronically generated image. Using high quality mirrors throughout the headset frame 108, including the viewing area 106 (instead of diffractive optics, for instance) improves the quality of the image viewed by the user (including a vivid and focused image with no chroma separation).

Also referring to FIGS. 7 and 8, for a stereoscopic image, the frame 108 may include two rigid waveguides 204 (one on each side of the frame 108, for instance), each leading to a dedicated viewing area 502, 504 for each eye. In such an embodiment, the flexible waveguide 110 may either be configured to carry two light image signals (optical multiplexing) or two flexible waveguides 110 may be run from the optical engine 102 to the frame 108, terminating at the two waveguides 204. In the case of a single flexible waveguide 110, the waveguide 110 may be configured to terminate at each of the rigid waveguides 204, and precise optics such as polarizers, mirrors, lenses, and the like, can be used at the two rigid waveguides 204 to separate the images and direct the correct image to the correct eye.

In another alternate implementation, the image may be transported optically from the optical engine 102 to the frame 108 over three flexible waveguides 110 (red, green, and blue components) which may be reconstituted at the optics at the frame 108, or at the first end or the second end of the rigid waveguides 204, for instance. The three flexible waveguides 110 may be doubled (two sets of each) in some cases, for a stereoscopic image.

In an alternate implementation, the flexible optical waveguide 110 from the optical engine 102 (coupled to the processing unit 104 in either scenario) may be run to the front of the frame 108 to direct the image to the viewing area 106 optics with no rigid waveguide 204 or a very minimal waveguide 204 at the transition of the flexible cable 110 and the viewing optics 502, 504. In this implementation, as with the previous implementations, the frame 108 is purely passive, receiving the light carrying the image and displaying the image on the mirrors of the viewing area 106.

Referring to FIGS. 9-13, in various implementations, the viewing area 106, including the individual portions 502 and 504, if present, may be configured for optimal viewing of the image, along with minimizing the size and weight of the headset 108, and particularly in the case of an AR headset system 100, distortion free viewing of the outside environment.

Figure 10:
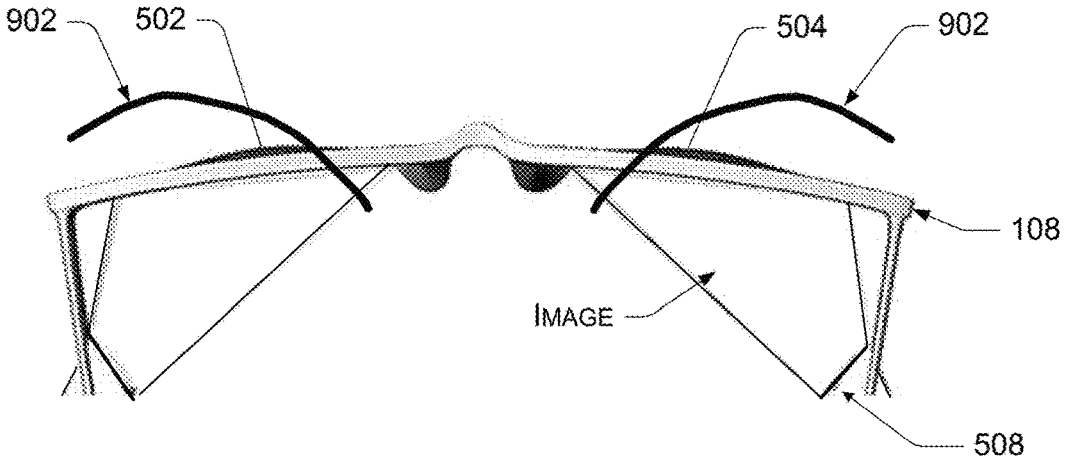

For instance, in one example, as shown in FIGS. 9 and 10, a single partial mirror may be configured for the viewing area 106, or an individual single partial mirror may be configured for each of the viewing portions 502 and 504. The single partial mirror or individual single partial mirrors may be semi-transparent mirrors, so that the image is reflected into the user's eyes, and so that the user can see the outside environment through the mirrors as well.

As shown in FIG. 9, in a general sense, the angle of incidence of the light of the image onto a mirror surface is equal to its angle of reflection. Light can be directed by altering the angle of the reflective surface. Divergent light from the optics of the headset 108, including the one or more lenses 508 of the optics, is reflected off the viewing portion 504 and converges into the user's eye.

When the viewing portion 504 is a single partial contoured mirror, the indicated shape 902 shows the shape of the single contoured partial mirror to be used to direct and converge the image to the user's eye. As shown in FIGS. 9 and 10, the viewing portions 502 and 504 may be extended somewhat from the headset 108 if single contoured partial mirrors having the indicated shape 902 are used. This may not be desirable in some applications.

As shown in FIG. 11, in some implementations, a viewing area 106 or a portion of a viewing area 502, 504 may comprise multiple mirrors instead of a single mirror. This arrangement is typically called a mirrored waveguide in which the image is inserted at one end of the mirrored waveguide using a reflector or separate mirror. The image (or light in general) is carried forward towards the other end of the mirrored waveguide via total internal reflection (TIR). FIG. 11 shows an example of a planar arrangement of a viewing area 106, having multiple mirrors all angled at a same angle (approximately a 45° angle). As shown, angling the multiple mirrors allows the image to "turn the corner" to be directed into the user's eyes. As above, the mirrors may be partially reflective, allowing the user to see the outside environment through the mirrors as well.

Figure 13:
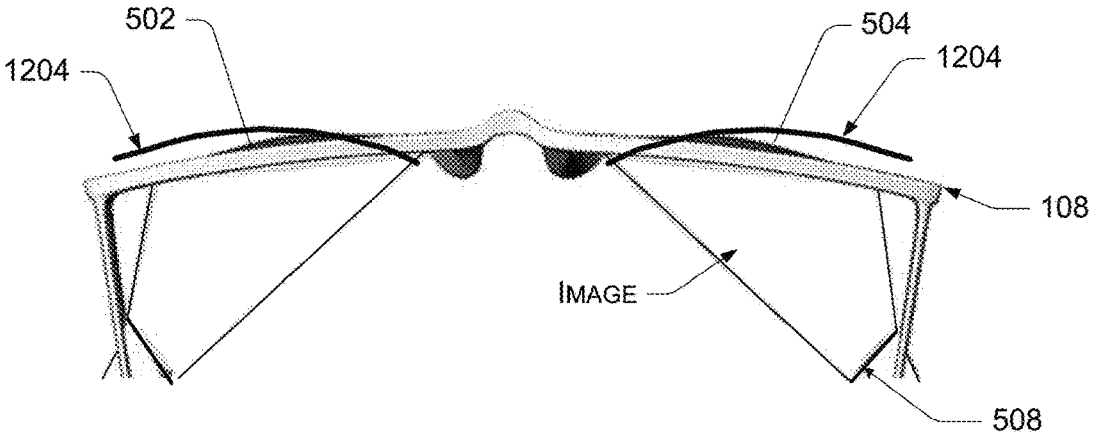

In an implementation, as shown in FIGS. 12 and 13, the concept of multiple mirrors can be improved upon, to provide a viewing area 106 and/or partial viewing areas 502, 504, as desired for a compact and lightweight headset 108. In the implementation, multiple small angled partial mirrors 1202 can be arranged in a predetermined configuration, to form a viewing portion 502, 504 as shown in FIG. 12. In an embodiment, the multiple small angled partial mirrors 1202 may be semi-transparent mirrors, so that the image is reflected into the user's eyes, and so that the user can see the outside environment through the mirrors as well.

Divergent light from the optics of the headset 108, including the one or more lenses 508 of the optics, is reflected off the viewing portion 504 and converges into the user's eye. As shown in FIG. 12, the viewing portion 504 can include the multiple small angled partial mirrors 1202 rather than a single mirrored surface. The divergent light of the image can be directed to the user's eye by altering the angle of each of the multiple small angled partial mirrors 1202, based on the position of the small angled partial mirror 1202. In the embodiment, the angle of each of the multiple small angled partial mirrors 1202 is progressively more steep as they progress from the outside of the frame 108 to the inside center of the frame 108.

In the illustrated example, the indicated shape 1204 shows the contour of the arrangement of the multiple small angled partial mirrors 1202 to be used to direct and converge the image to the user's eye. As shown in FIGS. 12 and 13, the viewing portions 502 and 504 may be significantly less extended from the headset 108, and have a more desirable contour when multiple small angled partial mirrors 1202 are arranged with the contour 1202.

In some embodiments, other media components, sensors or systems (or the like) may be added to the headset system 100, for an optimal experience. For instance, an audio system, a force feedback system, or the like, may be arranged to be interfaced with the headset 108, or may be partly or fully integrated into the headset system 100. For instance, in an embodiment, such components or systems may be integrated into the processing unit 104, or the like, and have connections to the headset 108. In an example, one or more electrical connections from one or more sensors or transducers on the frame 108 may be coupled to the processing unit 104 (e.g., for audio, etc.). The electrical connections may be made by electrical wires, by wireless connections, and so forth.

In another implementation, the headset system 100 may include one or more adjustments for image quality, based on flexing of the flexible waveguide cable. For instance, when the cable flexes, it may cause the image to become distorted. In the implementation, the processing unit 104 may include a variable adjustment to allow the user to adjust the image quality. The processing unit 104 may then pass the electrical signal to the optical engine 102 with the adjustment bias, causing the optical engine 102 to form the image with the adjustment bias built in. The image distortion in the flexed cable is accounted for with the adjustment, and the final image at the viewing area 106 has an improved image quality.

The techniques, components, and devices described herein with respect to the VR/AR headset system 100 are not limited to the illustrations of FIGS. 1-13, and may be applied to other designs, types, arrangements, and constructions including with other components or systems without departing from the scope of the disclosure. In some cases, additional or alternative components, techniques, sequences, or processes may be used to implement the techniques described herein. Further, the components and/or techniques may be arranged and/or combined in various combinations, while resulting in similar or approximately identical results.

Unless otherwise specified, additional or alternative components to those specifically mentioned may be used to implement the techniques described herein. In various implementations, a VR/AR headset system 100 may be a stand-alone unit, or it may be a portion of another system, component, structure, or the like.

Representative Process

Figure 14:
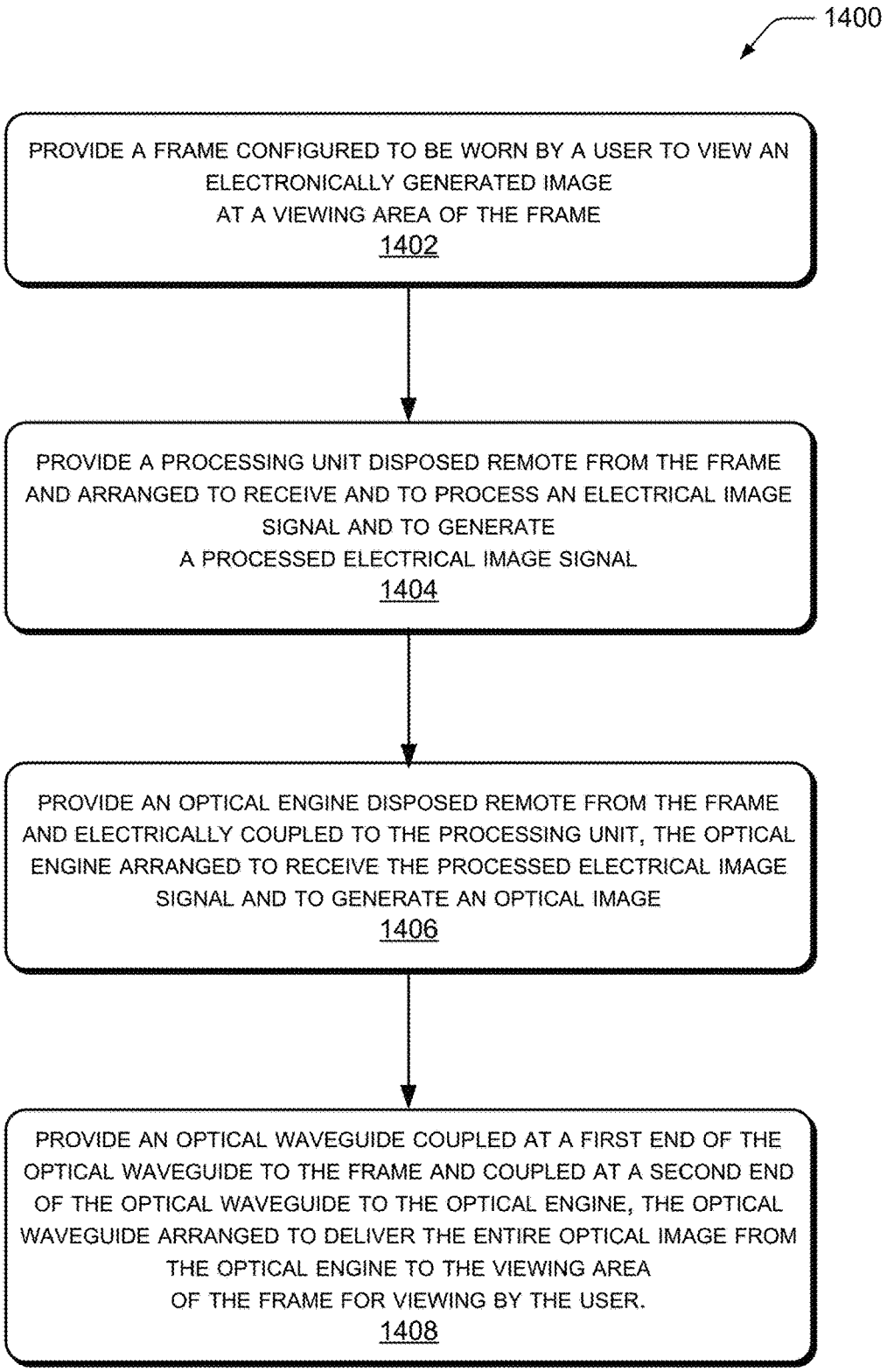
FIG. 14 is a flow diagram illustrating an example process for forming virtual images using a VR/AR headset system with remote optical engine, according to an implementation.

FIG. 14 illustrates a representative process 1400 for forming virtual images using a VR/AR headset system with remote optical engine (such as system 100, for example), according to an implementation. The process 1400 includes providing a head-mountable frame configured to be worn by a user to view an electronically generated image at a viewing area of the frame, and optically isolating the frame from image generating and processing components and systems. The example process 1400 is described with reference to FIGS. 1-13.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 1402, the process includes providing a frame (such as frame 108, for example) configured to be worn by a user to view an electronically generated image at a viewing area (such as viewing area 106, for example) of the frame.

At block 1404, the process includes providing a processing unit (such as processing unit 104, for example) disposed remote from the frame and arranged to receive and to process an electrical image signal and to generate a processed electrical image signal.

At block 1406, the process includes providing an optical engine (such as optical engine 102, for example) disposed remote from the frame and electrically coupled to the processing unit, the optical engine arranged to receive the processed electrical image signal and to generate an optical image.

At block 1408, the process includes providing an optical waveguide (such as waveguide 110, for example) coupled at a first end of the optical waveguide to the frame and coupled at a second end of the optical waveguide to the optical engine. In an embodiment, the optical waveguide is arranged to deliver the entire optical image from the optical engine to the viewing area of the frame for viewing by the user.

In an implementation, the optical waveguide is a first optical waveguide. In the implementation, the process further includes providing a second optical waveguide coupled at a first end of the second optical waveguide to the frame and coupled at a second end of the second optical waveguide to the optical engine. In the implementation, the first optical waveguide is arranged to deliver a first part of a stereoscopic optical image to a first part of the viewing area of the frame (such as portion 502, for example) and the second optical waveguide is arranged to deliver a second part of the stereoscopic optical image to a second part of the viewing area of the frame (such as portion 504, for example).

In various examples, the waveguide comprises a flexible waveguide, such as an optical cable, or a series of rigid waveguide portions coupled together with flexible couplers, moveable joints, or the like. The flexible couplers, moveable joints, or the like may include optical components such as mirrors, lenses, and so forth to couple the image through the rigid waveguide portions.

In an implementation, the process includes electrically isolating the frame from the processing unit and the optical engine. For example, the optical waveguide couples the generated image to the frame, maintaining the frame as a passive component.

In an implementation, the process includes providing a rigid waveguide at the frame, integral to or coupled to the frame, the optical waveguide being a flexible waveguide optically coupled to the rigid waveguide and the rigid waveguide being optically coupled to the viewing area of the frame.

In an implementation, the process includes providing one or more optical components, including a divergent lens at the first end of the rigid waveguide, arranged to project the optical image onto an inside surface of the viewing area.

In another implementation, the process includes providing one or more optical fibers at the frame, integral to or coupled to the frame, the optical waveguide being a flexible waveguide optically coupled to the one or more optical fibers and the one or more optical fibers being optically coupled to the viewing area of the frame.

In alternate implementations, other techniques may be included in the process in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A system, comprising:

a head-mountable frame configured to be worn by a user to view an electronically generated image at a viewing area of the frame;

an image processing unit disposed remote from the frame and electrically decoupled from the frame, the image processing unit arranged to receive and to process an electrical image signal and to generate a processed electrical image signal;

an optical engine disposed remote from the frame and electrically decoupled from the frame, the optical engine electrically coupled to the image processing unit, the optical engine arranged to receive the processed electrical image signal and to generate an optical image;

a rigid optical waveguide integral to the frame and optically coupled to the viewing area at a first end of the rigid optical waveguide, the rigid optical waveguide arranged to project the entire optical image onto the viewing area of the frame; and an optical waveguide coupled at a first end of the optical waveguide to a second end of the rigid optical waveguide of the frame and coupled at a second end of the optical waveguide to the optical engine, the optical waveguide and the rigid optical waveguide arranged to optically deliver the entire optical image from the optical engine to the viewing area of the frame for viewing by the user without electrical or data signals at the frame.

2. The system of claim 1, wherein the optical waveguide is a first optical waveguide, and further comprising a second optical waveguide coupled at a first end of the second optical waveguide to the frame and coupled at a second end of the second optical waveguide to the optical engine, the first optical waveguide arranged to deliver a first part of a stereoscopic optical image to a first part of the viewing area of the frame and the second optical waveguide arranged to deliver a second part of the stereoscopic optical image to a second part of the viewing area of the frame.

3. The system of claim 1, wherein the rigid optical waveguide is a first rigid optical waveguide and the viewing area is a first portion of the viewing area, and further comprising a second rigid optical waveguide integral to or coupled to the frame, opposite the first rigid optical waveguide, the second rigid optical waveguide coupled to a second portion of the viewing area at a first end of the second rigid optical waveguide and coupled to the optical waveguide at a second end of the second rigid optical waveguide, the second rigid optical waveguide arranged to project the entire optical image to the second portion of the viewing area of the frame.

4. The system of claim 3, further comprising a first divergent lens at the first end of the first rigid optical waveguide and a second divergent lens at the first end of the second rigid optical waveguide, the first and second divergent lenses arranged to project the optical image onto an inside surface of the viewing area.

5. The system of claim 3, wherein the viewing area comprises a mirrored waveguide coupled at the first end of the first and second rigid optical waveguides, and wherein a bending mirror or reflector is disposed at the first end of the optical waveguide and arranged to insert the optical image from the first and second rigid optical waveguides into the mirrored waveguide to deliver the optical image to multiple partial mirrors within the mirrored waveguide.

6. The system of claim 1, wherein the optical waveguide comprises one or more flexible optical cables, each including an optically transparent core surrounded by a reflective surface.

7. The system of claim 6, wherein the one or more flexible optical cables are arranged to simultaneously deliver multiple different optical images superimposed in a field of view of the user.

8. The system of claim 7, wherein one or more of the multiple different optical images have different focal distances from a point of view of the user.

9. The system of claim 1, wherein the optical waveguide comprises a planar waveguide arranged to transfer the optical image from the second end of the optical waveguide to the first end of the optical waveguide.

10. The system of claim 1, wherein the optical waveguide comprises three optical cables arranged to transfer the optical image in separate red, green, and blue components from the second end of the optical waveguide to the first end of the optical waveguide.

11. The system of claim 1, wherein the optical engine includes a separate enclosure from an enclosure of the processing unit, and wherein the optical engine is worn on a head or a neck of the user.

12. The system of claim 1, wherein the optical engine is disposed remote from a head of the user.

13. The system of claim 12, wherein remote is defined as greater than or equal to 10 cm.

14. The system of claim 1, wherein the optical image is reduced in at least one dimension while the optical waveguide delivers the optical image to the viewing area, and wherein an image front of the optical image is preserved and displayed at the viewing area.

15. The system of claim 1, wherein the viewing area comprises one or more semi-transparent mirrors arranged to reflect the optical image into an eye of the user and to allow the user to see objects in an environment of the user through the one or more semi-transparent mirrors.

16. The system of claim 1, wherein the viewing area comprises diffractive optics arranged to reflect the optical image into an eye of the user and to allow the user to see objects in an environment of the user through the one or more diffractive optics.

17. The system of claim 1, wherein the optical waveguide comprises a flexible optical waveguide and wherein a bend radius of the flexible optical waveguide is greater than 2.5 times a thickness of the flexible optical waveguide.

18. The system of claim 1, wherein the optical waveguide comprises one or more rigid waveguides joined together by one or more joining pieces comprising flexible materials.

19. A method, comprising;

providing a head-mountable frame configured to be worn by a user to view an electronically generated image at a viewing area of the frame;

providing an image processing unit disposed remote from the frame and electrically decoupled from the frame, the image processing unit arranged to receive and to process an electrical image signal and to generate a processed electrical image signal;

providing an optical engine disposed remote from the frame and electrically decoupled from the frame, the optical engine electrically coupled to the image processing unit, the optical engine arranged to receive the processed electrical image signal and to generate an optical image;

providing a rigid optical waveguide integral to the frame and optically coupled to the viewing area at a first end of the rigid optical waveguide, the rigid optical waveguide arranged to project the entire optical image onto the viewing area of the frame; and providing an optical waveguide coupled at a first end of the optical waveguide to a second end of the rigid optical waveguide of the frame and coupled at a second end of the optical waveguide to the optical engine, the optical waveguide and the rigid optical waveguide arranged to optically deliver the entire optical image from the optical engine to the viewing area of the frame for viewing by the user without electrical or data signals at the frame.

20. The method of claim 19, wherein the rigid optical waveguide is a first rigid optical waveguide, and further comprising providing a second rigid waveguide at the frame, integral to or coupled to the frame, the optical waveguide being a flexible waveguide optically coupled to the first and second rigid waveguides and the first and second rigid waveguides being optically coupled to separate portions of the viewing area of the frame.

21. The method of claim 19, further comprising providing one or more optical fibers at the frame, integral to or coupled to the frame, the optical waveguide being a flexible waveguide optically coupled to the one or more optical fibers and the one or more optical fibers being optically coupled to the viewing area of the frame.

* * * * *